United States Patent [19]

Inoue et al.

[11] 4,239,655
[45] Dec. 16, 1980

[54] PROCESS FOR THE PRODUCTION OF BONDED ZEOLITE BODIES

[75] Inventors: Takehisa Inoue, Tokyo; Kazuo Tsunoi, Kamakura, both of Japan

[73] Assignee: Toray Industries, Inc., Tokyo, Japan

[21] Appl. No.: 45,756

[22] Filed: Jun. 5, 1979

[30] Foreign Application Priority Data

Nov. 16, 1977 [JP]   Japan ................................ 52-136622

[51] Int. Cl.$^3$ ............................................. B01J 29/06
[52] U.S. Cl. ................................................ 252/455 Z
[58] Field of Search ................................... 252/455 Z

[56] References Cited

U.S. PATENT DOCUMENTS

| | | | |
|---|---|---|---|
| 3,326,818 | 6/1967 | Gladrow et al. | 252/455 Z |
| 3,553,102 | 1/1971 | Rosinski et al. | 252/455 Z |
| 4,102,821 | 7/1978 | Pessimisis | 252/463 |

*Primary Examiner*—Carl F. Dees
*Attorney, Agent, or Firm*—Frishauf, Holtz, Goodman & Woodward

[57] ABSTRACT

Bonded zeolite bodies are produced from a mixture of zeolite, polycarboxylic acid and water.

6 Claims, No Drawings

PROCESS FOR THE PRODUCTION OF BONDED ZEOLITE BODIES

BACKGROUND OF THE INVENTION

The present invention relates to a process for the production of bonded zeolite bodies.

Zeolites have unique adsorption properties and catalytic activities, and, therefore, recently they have been widely used in separation processes such as separation of p-xylene from $C_8$ aromatic hydrocarbons and separation of nitrogen from air, and catalytic processes such as disproportionation of toluene.

For general utility in commercial adsorption or catalytic processes, the zeolites are usually formed into the bonded bodies using binding agents.

Heretobefore, the bonded zeolite bodies have been commonly produced by the following process. The zeolite in powder form is kneaded with a binding agent and water, and then is shaped by means of extrusion or other granulating apparatus into the required form. The granules thus obtained are then dried and calcined. As binding agents in this field, clay mineral or other noncrystalline inorganic materials have been proposed, for example, kaolin, bentonite, attapulgite (U.S. Pat. No. 2,973,327), sodium silicate (British Pat. No. 982,872) and silica sol (British Pat. No. 974,643).

It is also known that some organic materials are used together with inorganic binding agents to improve the crush strength or attrition resistance of zeolite bodies. For example, combinations of attapulgite and stearic acid (U.S. Pat. No. 2,973,327), kaolin and lignosulfonate (U.S. Pat. No. 3,219,590), and kaolin and carboxymethylcellulose (Japanese Pat. Publication No. 32,572/1971) have been proposed.

In such a known process, the use of noncrystalline inorganic materials is required and, therefore, the obtained zeolite bodies contain therein at least 10%, usually 20–30%, by weight of noncrystalline inorganic materials. Needless to say, the inorganic binders have such disadvantages that they decrease the zeolite content in the bonded zeolite body and the adsorptive or catalytic efficiency of the zeolite is reduced proportionately.

SUMMARY OF THE INVENTION

It is an object of the present invention to provide a process for the production of bonded zeolitic bodies having higher zeolite content.

Other objects and advantages of the present invention will appear from the following description.

According to the present invention, bonded zeolite bodies are produced from a mixture comprising zeolite, polycarboxylic acid hereinafter definded and water.

DETAILED DESCRIPTION OF THE INVENTION

The polycarboxylic acids utilized as binding agent in the practice of the present invention are defined as compounds which contain at least two carboxyl groups and not more than ten carbon atoms except those of the carboxyl groups. The number of carboxyl groups is preferably 2 to 6. The carbon number other than carboxyl group is preferably 2 to 8. The polycarboxylic acids may include aliphatic, alicyclic and aromatic polycarboxylic acids, and also may include polycarboxylic acids containing any group having oxygen, sulfur, nitrogen or halogen atom therein, such as hydroxy group or amino group. Preferable polycarboxylic acids may include malonic acid, succinic acid, glutaric acid, maleic acid, itaconic acid, phthalic acid, pyromellitic acid, naphthalene dicarboxylic acid, malic acid, citric acid, tartaric acid, nitrilotriacetic acid and ethylenediamine tetraacetic acid. More preferable polycarboxylic acids may be chosen from hydroxypolycarboxylic acids such as citric acid and tartaric acid.

Zeolites to be used in the present invention may include both synthetic and natural zeolites. Any type of zeolites, for example, type X, type Y or type A, may be employed.

The polycarboxylic acid is used preferably in an amount of about 1–10 wt.% based on the zeolite.

When the amount of the polycarboxylic acid is less than about 1 wt.%, the stability of the obtained zeolite body may be insufficient. On the other hand, when the amount of the polycarboxylic acid is more than about 10 wt.%, it become difficult to control the temperature at the subsequent calcination step.

Water is used preferably in an amount of about 10–60 wt.% of the mixture.

The mixture thus obtained is formed into shaped bodies, such as small particles or granules, and dried, and then calcined at a temperature which is sufficiently high to burn off the polycarboxylic acid but below the destruction temperature of the zeolite crystals.

Production of shaped zeolite bodies may be performed by conventional methods.

For instance, the mixture of the zeolite powder, the polycarboxylic acid and water is blended or kneaded into a paste and the paste thus obtained is shaped into the desired form using extrudor, granulator or pelletizer.

The zeolite granules thus obtained are dried and calcined. The drying temperature is not limited but usually is 30°–150° C. The calcination temperature is sufficiently high to burn off the polycarboxylic acid but below the destructive temperature of the zeolite crystals, and preferably about 300°–700° C.

It is essential in the present invention that an aqueous solution of the polycarboxylic acid can bind the zeolite powder. Various organic compounds have already been used in this field, but none of them have binding ability themselves and, therefore, they have been used always together with an inorganic binding agent. In the conventional methods, such a known organic compound improves the binding strength of the inorganic binding agent or productivity of the zeolite bodies. So, the polycarboxylic acids used in the present invention are quite different from the conventional organic binding agents.

Of course, such conventional organic or inorganic binding agents as clay, alumina sol, starch and lignosulfonate may be used in addition to the polycarboxylic acids in the present invention. The bonded zeolite bodies thus obtained may be subjected to various treatments such as ion exchange treatment after the calcination step for use in adsorption, catalytic or other processes.

The following examples are illustrative, but are not intended to define or to limit the scope of the invention.

EXAMPLE 1

100 weight parts of sodium-form type Y zeolite was mixed with 5 weight parts of ethylenediaminetetra acetic acid, and 90 weight parts of water, and then the mixture was well kneaded into a stiff paste. The paste was stuffed into cylindrical moulds 3 mm$\phi$×3 mmH.

After the paste was dried in the moulds, the shaped zeolite bodies were taken out therefrom, and then calcined at 500° C. in the air for 3 hours. The same experiments were conducted but substituting nitrilotriacetic acid, citric acid, tartaric acid, pyromellitic acid and glutaric acid, individually, for the above ethylenediaminetetraacetic acid.

Each of the bonded zeolite bodies was tested for vertical crush strength by a crush strength tester. The test was conducted by putting a single zeolite body on a flat metal plate provided on a spring scale and increasing the loading force on the plate arranged to rest on top of the zeolite body until crushed. The crushing strength value (kg) is an average for at least 20 calcined zeolite bodies. The results are set forth in Table 1 which follows. Comparative Example The zeolite bodies were prepared by the method set forth in the above Example 1 but substituting gelatine, polyethylene glycol, acetic acid, kaolin, individually, for the polycarboxylic acid.

The crush strength of the zeolite bodies thus obtained are set forth in Table 1.

TABLE 1

| Organic Compound | Crush Strength (kg) |
| --- | --- |
| ethylenediaminetetraacetic acid | 8.5 |
| nitrilotriacetic acid | 10.8 |
| citric acid | 9.4 |
| tartaric acid | 9.0 |
| pyromellitic acid | 4.8 |
| glutaric acid | 3.6 |
| starch | 1.7 |
| polyethylene glycol | 1.4 |
| acetic acid | 1.1 |

TABLE 1-continued

| Organic Compound | Crush Strength (kg) |
| --- | --- |
| kaolin | 4.0 |

EXAMPLE 2

100 weight parts of calcium-form type A zeolite was mixed with 5 weight parts of citric acid, 2 weight parts of starch, and 90 weight parts of water, and then the mixture was kneaded into a stiff paste. The paste was extruded into 1 mm$\phi$ pellets. These pellets were dried, and calcined in the air at 550° C. for 3 hours. The value of crush strength of this pellet was 1.0 kg, and the volume of air which was adsorbed in the pellet at 20° C. and atmospheric pressure was 9 ml/g, which is the same amount as that of the pure calcium-form A type zeolite powder.

We claim:

1. A process for the production of bonded zeolite bodies which comprises mixing zeolite with water and polycarboxylic acid having at least two carboxyl groups and not more than ten carbon atoms except those of carboxyl groups, forming the mixture into shaped bodies, and drying and calcining the shaped bodies.

2. The process as described in claim 1 wherein said polycarboxylic acid is used in an amount of about 1–10 wt.% based on the zeolite.

3. The process as described in claim 1 wherein water is used in an amount of about 10–60 wt.% based on the total weight of the mixture.

4. The process as described in claim 1 wherein said polycarboxylic acid is hydroxy-polycarboxylic acid.

5. The process as described in claim 3 wherein said hydroxy-polycarboxylic acid is citric acid.

6. The process as described in claim 3 wherein said hydroxy-polycarboxylic acid is tartaric acid.

* * * * *